(12) United States Patent
Imai et al.

(10) Patent No.: US 8,622,535 B2
(45) Date of Patent: Jan. 7, 2014

(54) INKJET INK AND RECORDING UNIT

(75) Inventors: Takashi Imai, Kawasaki (JP); Kousuke Yamasaki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 361 days.

(21) Appl. No.: 12/963,423

(22) Filed: Dec. 8, 2010

(65) Prior Publication Data
US 2011/0141194 A1 Jun. 16, 2011

(30) Foreign Application Priority Data

Dec. 11, 2009 (JP) ................... 2009-282282

(51) Int. Cl.
*B41J 2/01* (2006.01)

(52) U.S. Cl.
USPC ............. 347/100; 347/95; 106/31.6; 523/160

(58) Field of Classification Search
USPC ......... 347/100, 95, 96, 101, 88, 99, 103, 102, 347/105, 20, 21, 9; 106/31.6, 31.13, 31.27; 523/160, 161

See application file for complete search history.

(56) References Cited

U.S. PATENT DOCUMENTS

| | | | | |
|---|---|---|---|---|
| 5,854,320 A | * | 12/1998 | Nakamura et al. | 523/160 |
| 6,171,381 B1 | * | 1/2001 | Yoshimura et al. | 106/31.6 |
| 6,821,330 B1 | * | 11/2004 | Sano et al. | 106/31.58 |
| 2008/0259100 A1 | * | 10/2008 | Rengaswamy et al. | 347/100 |

FOREIGN PATENT DOCUMENTS

JP   2004-269800 A   9/2004

* cited by examiner

*Primary Examiner* — Manish S Shah
(74) *Attorney, Agent, or Firm* — Canon USA Inc. IP Division

(57) ABSTRACT

An inkjet ink contains a pigment, a water-soluble resin having a hydrophobic group, an inclusion compound, and water. The water-soluble resin includes a part adsorbed to the pigment and a part not adsorbed to the pigment. The inclusion compound is cyclodextrin or a cyclodextrin derivative. The mass ratio of the part not adsorbed of the water-soluble resin to the inclusion compound is in the range of 0.30 to 9.00.

6 Claims, 3 Drawing Sheets

INKJET INK AND RECORDING UNIT

BACKGROUND OF THE INVENTION

1. Field of the Invention

The present invention relates to an inkjet ink and a recording unit.

2. Description of the Related Art

It has been known that the state of the surface having ejection orifices (hereinafter referred to as face side) of a recording head from which an inkjet ink (hereinafter referred to as simply ink) is ejected is changed as the ink is ejected. Particularly when an ink containing a pigment dispersed by a resin is used, the resin is gradually adsorbed to the face side of the recording head as the ink is ejected. Consequently, the surface characteristics of the face side are changed. The change of the surface characteristics of the face side may be referred to as face wetting. If an ink is ejected from ejection orifices of a recording head at which face wetting has occurred, ink droplets may land on positions different from intended positions where the ink droplets should land, thus producing a scrambled image. The phenomenon producing a scrambled printed image may be referred to as landing misalignment of ink droplets.

Japanese Patent Laid-Open No. 2004-269800 proposes a technique for reducing the landing misalignment by appropriately setting the surface tension of the ink and the contact angle between the face side of the recording head and the ink from which 20% or more of volatile component has been removed.

As a result of a study of this technique, the present inventors have successfully reduced the degree of face wetting to a specific level. However, an ink capable of further suppressing face wetting is desired in connection with a recent demand for more high-quality images.

SUMMARY OF THE INVENTION

Aspects of the present invention provide an inkjet ink capable of suppressing face wetting to reduce landing misalignment.

According to an aspect of the present invention, an inkjet ink is provided which contains a pigment, a water-soluble resin having a hydrophobic group, an inclusion compound, and water. The water-soluble resin includes a part adsorbed to the pigment and a part not adsorbed to the pigment. The inclusion compound is cyclodextrin or a cyclodextrin derivative. The mass ratio of the part not adsorbed of the water-soluble resin to the inclusion compound is in the range of 0.30 to 9.00.

The inkjet ink can suppress face wetting and thereby reduce landing misalignment.

Further features of the present invention will become apparent from the following description of exemplary embodiments with reference to the attached drawings.

DESCRIPTION OF THE EMBODIMENTS

Figure 1:
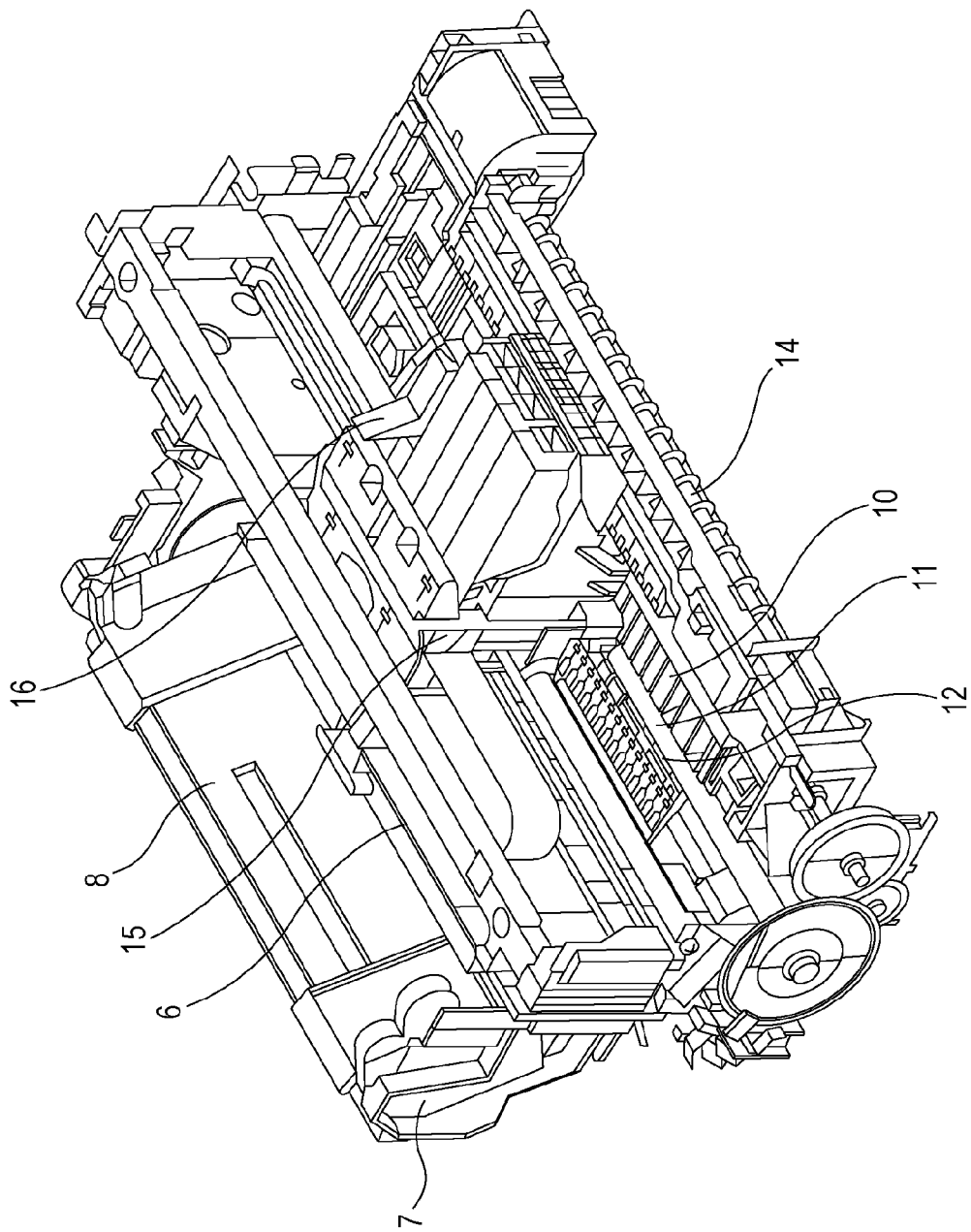
FIG. 1 is a perspective view taken from a front, left side of a recording apparatus according to an embodiment of the present invention.

The present inventors think that the mechanism described below is at least one of the reasons why inks according to embodiments of the invention can suppress face wetting and thereby reduce landing misalignment of ink droplets, without being limited thereto. Mechanisms of face wetting and landing misalignment will now be described. An ink according to an embodiment of the present invention contains a water-soluble resin having a hydrophobic group. Pigments are typically hydrophobic. The hydrophobic group of the water-soluble resin can be adsorbed to the pigment in the ink by hydrophobic interaction between the hydrophobic group and the pigment. The water-soluble resin in the ink is in an equilibrium state between a part adsorbed to the pigment and the other part (free resin) not adsorbed to the pigment. Therefore, even if it is attempted to adsorb the water-soluble resin to the pigment in an ink, the ink contains free resin. The free resin has a hydrophobic group, as well as the water-soluble resin adsorbed to the pigment. Many of the face sides of recording heads are hydrophobic. Accordingly, the hydrophobic group of the free resin is likely to be adsorbed to the face side of the recording head by hydrophobic interaction. The face side to which the water-soluble resin has been adsorbed is more hydrophilic than the face side to which no water-soluble resin has been adsorbed. Hence, the surface characteristics of the water-soluble resin-adsorbed face side have been changed (face wetting has occurred). If face wetting has occurred around the ejection orifices, the ink droplets being ejected from the ejection orifices are drawn in the direction of the face wetting. Consequently, the ink droplets are misdirected to positions different from positions on which ink droplets would land if the face wetting did not occur. Probably, landing misalignment of ink droplets thus occurs.

The results of study by the present inventors and a presumptive mechanism of the embodiments of the invention will now be described. In order to reduce face wetting, the present inventors attempted to reduce the amount of the part of water-soluble resin not adsorbed to the pigment in an ink. However, the part of water-soluble resin adsorbed to the pigment is in an equilibrium state with the part of water soluble resin not adsorbed to the pigment. Therefore, in order to reduce the content of the water-soluble resin not adsorbed to the pigment, the content of the water-soluble resin adsorbed to the pigment is reduced.

Accordingly, the present inventors added cyclodextrin or a cyclodextrin derivative to an ink, as an inclusion compound having a ring structure capable of enclosing the water-soluble resin not adsorbed to the pigment. If cyclodextrin or a cyclodextrin derivative encloses the water-soluble resin not adsorbed to the pigment, the contact of the water-soluble resin with face side can be prevented. The ring structure of cyclodextrin and cyclodextrin derivatives is hydrophobic on the inner side. The inner side of the ring structure of such an inclusion compound interacts with the hydrophobic group of the water-soluble resin, so that the inclusion compound caps the hydrophobic group of the water-soluble resin. Consequently, the hydrophobic interaction can be prevented between the hydrophobic group of the water-soluble resin and the face side of the recording head. Thus, by adding an inclusion compound as described above, the contact between the water-soluble resin and the face side of the recording head can be physically and chemically prevented. However, if compounds having a ring structure whose inner side is hydrophilic, such as crown ethers, are used as an inclusion compound, the inclusion compound cannot cap the hydrophobic group of the water-soluble resin, and accordingly cannot sufficiently prevent the hydrophobic interaction between the hydrophobic group of the water-soluble resin and the face side.

Since the outer side of the ring structure of cyclodextrin and cyclodextrin derivatives is hydrophilic, the outer side is unlikely to interact with the hydrophobic face side of the recording head. Accordingly, such an inclusion compound or a composite of the inclusion compound and the water-soluble resin can be prevented from being adsorbed to the face side.

Furthermore, the present inventors found that when the mass ratio of the free resin to the inclusion compound in the inkjet ink (mass of free resin/mass of inclusion compound) is in the range of 0.30 to 9.00, face wetting can be suppressed to a great extent, and thus landing misalignment can be reduced.

The invention will be further described in detail.

Inkjet Ink

Pigment

An ink of an embodiment of the present invention contains a pigment. Any pigment, such as a known black pigment or a known color pigment, can be used in the ink without particular limitation. For example, pigments designated by color index (C. I.) numbers can be used. A carbon black can be used as a black pigment. The pigment content in the ink can be 1.0% to 15.0% by mass, such as 1.0% to 10.0% by mass. The pigment is dispersed in the ink. How the pigment is dispersed is not particularly limited, and the following methods may be applied. For dispersing a pigment, a resin dispersant may be used (resin dispersion method), or the dispersibility of the pigment may be enhanced by introducing a hydrophilic group to the surfaces of the pigment particles (self dispersion method). If a resin dispersion method is applied in an embodiment of the present invention, the resin dispersion may be a water-soluble resin described below or another type.

Water-Soluble Resin

The water-soluble resin in an ink of an embodiment of the invention has a hydrophobic group. The water-soluble resin having a hydrophobic group can be a copolymer produced by copolymerization of a hydrophobic monomer and a hydrophilic monomer. The hydrophobic monomer can form the hydrophobic group of the water-soluble resin by being polymerized, and the hydrophilic monomer can impart solubility in water to the resin by being polymerized.

Examples of the hydrophobic monomer used for producing the water-soluble resin having a hydrophobic group include, but are not limited to, known hydrophobic monomers, such as styrene, styrene derivatives, benzyl acrylate, and benzyl methacrylate. Examples of the hydrophilic monomer include, but are not limited to, known hydrophilic monomers, such as acrylic acid, methacrylic acid, and maleic acid. In an embodiment, the water-soluble resin can be a copolymer of acrylic acid and styrene.

The water-soluble resin can have an acid value in the range of 50 to 350 mg KOH/g, such as in the range of 80 to 250 mg KOH/g. The weight average molecular weight of the water-soluble resin can be in the range of 1000 to 30000. The polydispersity (ratio of weight average molecular weight Mw to number average molecular weight Mn, Mw/Mn) of the water-soluble resin can be in the range of 1.0 to 3.0. The water-soluble resin can be neutralized with a base, such as KOH. The water-soluble resin content can be in the range of 0.3% to 15.0% by mass relative to the total mass of the ink.

Water-Soluble Resin not Adsorbed to Pigment

Part of the water-soluble resin is not adsorbed to the pigment in the ink; hence, the ink contains free resin. The free resin in the ink refers to a part of the water-soluble resin other than the part adsorbed to the pigment. Hence, the free resin includes the part of the water-soluble resin not adsorbed to the pigment, but enclosed in an inclusion compound or its derivative.

The mass ratio of the water-soluble resin not adsorbed to the pigment (free resin) to the inclusion compound (mass of free resin/mass of inclusion compound) in the ink is in the range of 0.30 to 9.00. If the free resin/inclusion compound mass ratio is less than 0.30, the inclusion compound is excessive in amount to the free resin. The excessive molecules of the inclusion compound are associated with each other. The associated inclusion compound is less hydrophilic than the inclusion compound not associated, and is accordingly liable to be adsorbed to the face side of the recording head to cause face wetting. On the other hand, if the free resin/inclusion compound mass ratio is more than 9.00, the free resin is excessive in amount to the inclusion compound, and the inclusion compound cannot enclose the entirety of the free resin. Consequently, the water-soluble resin is adsorbed to the face side of the recording head to cause face wetting. In an embodiment of the present invention, the free resin/inclusion compound mass ratio can be in the range of 1.60 to 9.00.

The amount of the free resin can be determined as below. The ink of which the amount of the free resin is to be measured is centrifuged at 80000 rpm for 5 hours, and the supernatant is collected. The collected supernatant is evaporated to dryness. The resulting solid matter is weighed, and thus the amount of the free resin can be calculated. Even if the ink contains a plurality of resins, the amount of free resin can be obtained by weighing the solid matter prepared as above. If the solid matter prepared by evaporation to dryness contains a substance other than resin, the amount of the free resin can be obtained by calorimetry. For example, changes in mass of the solid matter around the decomposition temperature of the resin component are measured with a calorimeter Q500 manufactured by TA Instrument. The amount of the free resin can be controlled by removing part of the supernatant after centrifugation of the ink for separating a precipitate and supernatant and then by dispersing the precipitate in the rest of the supernatant. Alternatively, the amount of the water-soluble resin to be added to the ink may be adjusted to control the amount of the free resin. The free resin is a substance responsible for face wetting. Therefore, the free resin content in the ink can be minimized, as long as a sufficient amount of water-soluble resin is adsorbed to the pigment.

Inclusion Compound

The ink contains an inclusion compound. The inclusion compound is cyclodextrin or a cyclodextrin derivative. Cyclodextrin and cyclodextrin derivatives have a ring structure capable of enclosing the water-soluble resin, and the inner side of the ring structure is hydrophobic and the outer side is hydrophilic. The cyclodextrin derivative may be a compound produced by substituting a group other than the hydroxyl group, such as the methyl group, for some or all of the hydroxyl groups or ether bonds in the structure of cyclodextrin. Examples of the cyclodextrin include α-cyclodextrin, β-cyclodextrin, and γ-cyclodextrin. Examples of the cyclodextrin derivative include methyl-β-cyclodextrin, hydroxypropyl-β-cyclodextrin, hydroxypropyl-γ-cyclodextrin, trimethyl-β-cyclodextrin, 2,6-di-O-methyl-β-cyclodextrin, and poly-β-cyclodextrin. In an embodiment of the present invention, the inclusion compound can be methyl-β-cyclodextrin, which is a cyclodextrin derivative. The inclusion compound content can be in the range of 0.03% to 30% by mass relative to the total mass of the ink.

Water and Water-Soluble Organic Solvent

The ink contains water, and can contain a mixture of water and a water-soluble organic solvent as an aqueous medium. The water-soluble organic solvent is not particularly limited, and can be selected from known water-soluble organic solvents. Examples of the water-soluble organic solvent include glycerol, ethanol, methanol, 2-propanol, polyethylene glycol, and 2-pyrrolidone. The water-soluble organic solvent content is not particularly limited, and can be in the range of 3.0% to 50% by mass relative to the total mass of the ink. The water can be deionized water. The water content is not particularly limited, and can be in the range of 50% to 95% by mass relative to the total mass of the ink.

Preparation of Ink

The ink may be prepared by mixing constituents including water, a pigment, a water-soluble resin and an inclusion compound. In an embodiment of the present invention, the inclusion compound can be added to the mixture of the other constituents. If the inclusion compound, the water-soluble resin and the pigment are mixed at one time, the dispersion stability of the pigment may be reduced. If the water-soluble resin is added to a mixture of the pigment and the inclusion compound, the inclusion compound may not sufficiently enclose the water-soluble resin.

Inkjet Recording Apparatus

Figure 2:
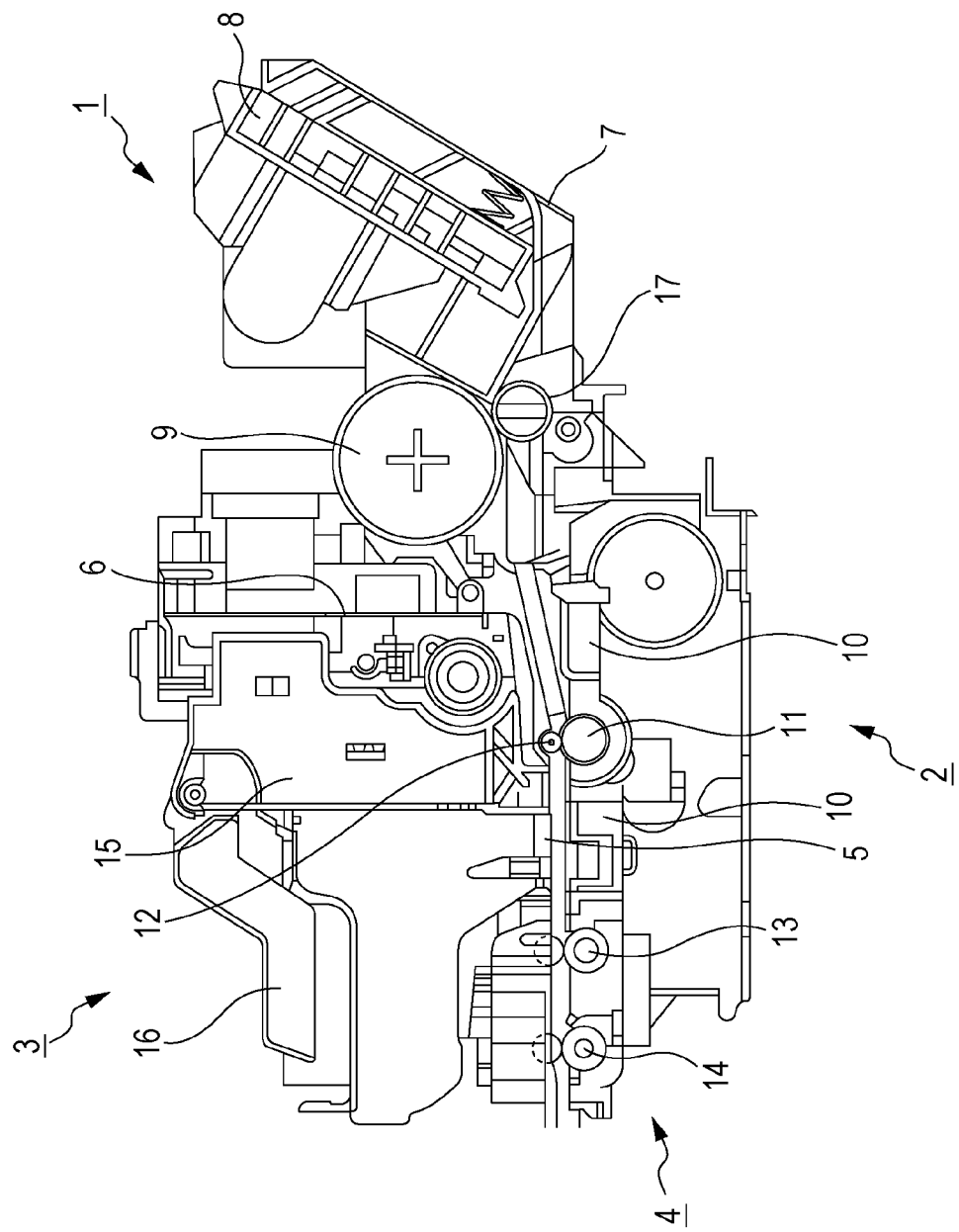
FIG. 2 is a vertical sectional view of the recording apparatus.

A recording apparatus used in an embodiment of the present invention will now be described with reference to the drawings. FIG. 1 is a perspective view taken from a front, left side of the recording apparatus. FIG. 2 is a vertical sectional view of the recording apparatus. The recording apparatus includes a feeding section 1, a conveying section 2, a carriage section 3, a paper ejecting section 4, and a control substrate 6. The present embodiment describes an inkjet recording apparatus performing recording by ejecting ink from ejection orifices of a recording head 5 onto a sheet according to image information.

The feeding section 1 includes a pressure plate 8 on which sheets are stacked, a feeding roller 9 feeding the sheets, and a separation roller 17 separating the sheets. These components of the feeding section 1 are mounted on a feeding base 7. The operation of the feeding section 1 will now be described. In a waiting state, the pressure plate 8 and the separation roller 17 are released. Then, the pressure plate 8 is abutted on the feeding roller 9. The feeding roller 9 feeds the sheets to the conveying section 2. A conveying roller 11 is provided with a plurality of pinch rollers 12. The pinch rollers 12 are abutted on the conveying roller 11 so as to be rotated by the rotation of the conveying roller 11. The pinch rollers 12 are pressed against the conveying roller 11 by a pinch roller spring, thereby generating a power for conveying sheets. The sheet delivered to the conveying section 2 is conveyed along the upper surface of the platen 10 in such a manner as to be pinched between the conveying roller 11 and the pinch rollers 12.

The carriage section 3 includes a reciprocally movable carriage 15 on which the recording head 5 is mounted. The recording head 5 is positioned and secured to the carriage 15 by a head set lever 16 rotatably supported by the carriage 15. The recording head 5 ejects ink from ejection orifices onto the sheet to record an image on the sheet by driving a heater (heating element substrate) according to recording data. An ink tank containing an ink to be supplied to the recording head 5 is mounted in the recording head 5 in such a manner as to be removable for replacement.

Figure 3:
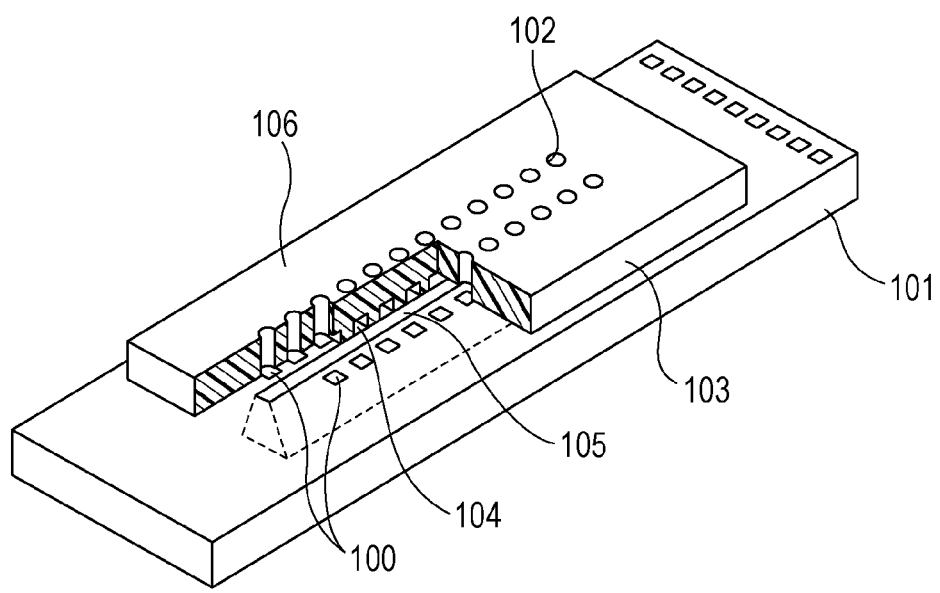
FIG. 3 is a schematic perspective view of a recording head according to an embodiment of the present invention.

The recording head 5 will be further described in detail with reference to FIG. 3. FIG. 3 is a schematic perspective view of an exemplary structure of the recording head 5. As shown in FIG. 3, the recording head includes a substrate 101 having a plurality of energy generating elements 100 generating an energy used for ejecting ink, an ejection orifice member 103 disposed on the substrate. The ejection orifice member 103 has ejection orifices 102 formed corresponding to the energy generating elements 100. The ejection orifice member 103 also serves as a flow path forming member in which liquid flow paths 104 communicating with the ejection orifices 102 are formed. Liquid supply ports 105 are formed passing through the substrate 101. The surface 106 of the ejection orifice member 103 in which the ejection orifices 102 are formed is the face side of the recording head 5.

A carriage substrate has a contact through which it is electrically connected to the recording head 5. The control substrate 6 of the recording apparatus and the carriage substrate are connected to each other with a flexible substrate transmitting a head signal to the recording head 5. For image recording, first, the conveying roller 11 is driven to convey the sheet to a recording line position. Then, the carriage 15 is moved, and in synchronization with the movement of the carriage 15, the recording head 5 is driven according to recording information. An image is thus recorded by ejecting ink through the ejection orifices of the recording head 5. The paper ejecting section 4 includes two paper ejection rollers 13 and 14 provided to the platen 10. The paper ejection rollers 13 and 14 are rotated in synchronization with the conveying roller 11 to eject the image-recorded sheet to the outside.

Although a thermal jet recording head ejecting ink according to recording data has been described as a type of recording head in the above embodiment, the recording head is not limited to this type. In other embodiments, the recording apparatus may include a piezoelectric jet recording head using a piezoelectric element for ejecting ink.

Although the ink tank is removably mounted in the recording head for replacement in the above embodiment, the ink tank may be integrated with the recording head into one body so that the recording head and the ink tank can be replaced at one time.

Recording Head

The face side of the recording head can be subjected to water-repellent treatment. For the water-repellent treatment, a water-repellent agent can be applied onto the face side of the recording head. The water-repellent agent can be, but is not limited to, a fluorine-containing compound.

EXAMPLES

The present invention will be further described in detail with reference to Examples and Comparative Examples. In the following description, "%" and "part(s)" are on a mass basis unless otherwise specified.

Preparation of Pigment Dispersion

Pigment Dispersion B1

The mixture of the following compounds was placed in a batch-type vertical sand mill (manufacture by Aimex), and then 200 parts of zirconia beads of 0.3 mm in diameter was placed in the sand mill. Thus the compounds were dispersed with cooling for 5 hours to yield a dispersion solution. Resin aqueous solution P1 below is an aqueous solution containing 20% by mass of styrene-butyl acrylate-acrylic acid copolymer (acid value: 190, weight average molecular weight: 9000) neutralized with KOH, which is a water-soluble resin.

| | |
|---|---|
| Carbon black (Monarch 1100, produced by Cabot): | 10 parts |
| Resin Aqueous Solution P1: | 12.5 parts |
| 2-Pyrrolidone: | 10 parts |
| Pure water: | 67.5 parts |

The resulting dispersion solution was centrifuged to remove coarse particles, thus preparing Pigment Dispersion B1 containing about 10% of pigment having weight average particle size of 70 nm. Pigment dispersion B1 was centrifuged at 80000 rpm for 5 hours, and the supernatant was collected. The collected supernatant was evaporated to dryness. The resulting solid matter was weighed, and thus the amount of the free resin was calculated. The amount of free resin in Pigment Dispersion B1 calculated from the measurement results was 1.2% by mass.

Pigment Dispersion B2

Pigment dispersion B2 was prepared in the same manner as the preparation of Pigment Dispersion B1, except that Resin Aqueous Solution P2 was used instead of Resin Aqueous Solution P1. Resin Aqueous Solution P2 below is an aqueous solution containing 20% by mass of styrene-butyl acrylate-acrylic acid copolymer (acid value: 120, weight average molecular weight: 9000) neutralized with KOH, which is a water-soluble resin. Pigment Dispersion B2 contained 10% of pigment having a weight average particle size of 70 nm, and the amount of free resin in Pigment Dispersion B2 was 1.1% by mass.

Preparation of Black Ink

Black Inks 1 to 10

Black Inks 1 to 10 were prepared according to the compositions shown in Table 1. More specifically, constituents shown in Table 1 were mixed and sufficiently stirred. The mixture was subjected to pressure filtration through a micro filter having a pore size of 3.0 µm (manufactured by Fujifilm). Thus Black Inks 1 to 10 were prepared. Each of Black Inks 1 to 10 was centrifuged at 80000 rpm for 5 hours, and the supernatant was collected. The collected supernatant was evaporated to dryness. The mass ratio of the water-soluble resin not adsorbed to the pigment to the inclusion compound (free resin/inclusion compound mass ratio) was calculated from the amount of free resin obtained from the mass of the solid matter and the amount of inclusion compound added to Black Inks 1 to 10. The calculated mass ratios are shown in Table 1. The amounts of Resin Aqueous Solutions P1 and P2 shown in Table 1 are those of additional Resin Aqueous Solutions P1 and P2 added for preparing the ink, but are not those of Resin Aqueous Solutions P1 and P2 contained in pigment dispersions B1 and B2. Black inks 1 to 10 were each adjusted to 100 parts with water.

TABLE 1

|  | Example 1 Black Ink 1 | Example 2 Black Ink 2 | Example 3 Black Ink 3 | Example 4 Black Ink 4 | Example 5 Black Ink 5 |
|---|---|---|---|---|---|
| Pigment Dispersion B1 | 40 parts | — | 40 parts | 40 parts | 40 arts |
| Pigment Dispersion B2 | — | 40 parts | — | — | — |
| Resin Aqueous Solution P1 | 20 parts | — | 20 parts | 20 parts | 20 parts |
| Resin Aqueous Solution P2 | — | 20 parts | — | — | — |
| α-Cyclodextrin | 2 parts | 2 parts | 0.6 parts | — | — |
| Methyl-β-cyclodextrin | — | — | — | 10 parts | 2 parts |
| Glycerin | 10 parts | 10 parts | 10 parts | 10 parts | 10 parts |
| Maltose | — | — | — | — | — |
| Sucrose | — | — | — | — | — |
| Water | Balance (28 parts) | Balance (28 parts) | Balance (29.4 parts) | Balance (20 parts) | Balance (28 parts) |
| Free resin/inclusion compound | 2.24 | 2.22 | 7.47 | 0.45 | 2.24 |

|  | Comparative Example 1 Black Ink 6 | Comparative Example 2 Black Ink 7 | Comparative Example 3 Black Ink 8 | Comparative Example 4 Black Ink 9 | Comparative Example 5 Black Ink 10 |
|---|---|---|---|---|---|
| Pigment Dispersion B1 | 40 parts | 40 parts | 40 parts | 40 parts | 40 parts |
| Pigment Dispersion B2 | — | — | — | — | — |
| Resin Aqueous Solution P1 | 20 parts | 20 parts | 20 parts | 20 parts | 20 parts |
| Resin Aqueous Solution P2 | — | — | — | — | — |
| α-Cyclodextrin | — | — | — | 0.3 parts | — |
| Methyl-β-cyclodextrin | — | — | — | — | 16 parts |
| Glycerin | 10 parts | 10 parts | 10 parts | 10 parts | 10 parts |
| Maltose | 2 parts | — | — | — | — |
| Sucrose | — | 2 parts | — | — | — |
| Water | Balance (28 parts) | Balance (28 parts) | Balance (30 parts) | Balance (29.7 parts) | Balance (14 parts) |
| Free resin/inclusion compound | — | — | — | 14.93 | 0.28 |

Black Ink 11

| Carbon black (Monarch 1100, produced by Cabot): | 4 parts |
|---|---|
| Resin Aqueous Solution P1: | 6 parts |
| Diethylene glycol: | 12 parts |
| 2-Propanol: | 3 parts |
| α-Cyclodextrin: | 3 parts |
| Pure water: | balance |

The mixture of the above compounds except diethylene glycol was placed in a batch-type vertical sand mill (manufactured by Aimex), and then 200 parts of zirconia beads of 0.3 mm in diameter was placed in the sand mill. Thus the compounds were dispersed with cooling for 5 hours. The resulting dispersion solution was centrifuged to remove coarse particles, and diethylene glycol was added to the dispersion solution to yield Black Ink 11. The total amount of Black Ink 11 was 100 parts. The amount of free resin in Black Ink 11 was 0.6%, and the mass ratio of the free resin to the inclusion compound was 0.20.

Preparation of Substrate

Methacryloxypropyltrimethoxysilane and methyltriethoxysilane were hydrolyzed in water, and subsequently heated for condensation reaction to obtain a reaction product. Then, perfluorooctyltriethoxysilane was added to the product for further hydrolysis. The reaction product was heated for condensation reaction to yield a stock solution of a water-repellent agent. Then, the stock solution was diluted with ethanol so that the nonvolatile component content in the solution became 10%, and 1.5% of Irgacure 165 (produced by Ciba-Geigy) was added as a photopolymerization initiator. The resulting solution was filtered through a filter having a pore sized of 1.0 μm to yield a water-repellent agent containing a fluorine compound. The resulting water-repellent agent was applied to a silicon wafer by spin coating. After drying the solvent in the water-repellent agent, the wafer was irradiated with UV light in a UV curing oven and then heated at a rate of 90° C./10 min to cure the water-repellent agent. A substrate subjected to water-repellent treatment was thus prepared. This substrate is a test piece at which the conditions of the face side of a recording head have been reproduced.

Evaluation of Face Wetting

The receding contact angle of the substrate was measured with a contact angle meter (DropMaster 700, manufactured by Kyowa Interface Science). Substrates prepared above were immersed in respective Black Inks 1 to 11. Black Inks 1 to 11 were stored at 40° C. for 72 hours. After 72 hours, the substrate was taken out of each Black Ink and rinsed with pure water for 1 minute. Then, the receding contact angle of the substrate was measured with the contact angle meter. The face wetting of each substrate was evaluated from the measurement results, according to the following evaluation criteria. The results are shown in Table 2. The change of the receding contact angles before and after immersion in the ink indicates a change of the surface characteristics of the substrate. A large change in receding contact angle means that the change of the surface characteristics of the substrate is large (face wetting has occurred), and a small change in receding contact angle means that the change of the surface characteristics of the substrate is small (the face wetting has been suppressed). Accordingly, as the difference between the contact angles before and after immersing the substrate in an ink was reduced, the ink was considered to be capable of more suppressing face wetting. Also, when the evaluation result of an ink according to the flowing criteria is any one of A to C, the ink can suppress face wetting.

A: 0≤difference in receding contact angle<5
B: 5≤difference in receding contact angle<8
C: 8≤receding contact angle<10
D: 10≤difference in receding contact angle

TABLE 2

|  |  | Face wetting |
|---|---|---|
| Example 1 | Black Ink 1 | B |
| Example 2 | Black Ink 2 | B |
| Example 3 | Black Ink 3 | B |
| Example 4 | Black Ink 4 | C |
| Example 5 | Black Ink 5 | A |
| Comparative Example 1 | Black Ink 6 | D |
| Comparative Example 2 | Black Ink 7 | D |
| Comparative Example 3 | Black Ink 8 | D |
| Comparative Example 4 | Black Ink 9 | D |
| Comparative Example 5 | Black Ink 10 | D |
| Comparative Example 6 | Black Ink 11 | D |

The results of the above Examples show that inks according to embodiments of the present invention can reduce landing misalignment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-282282 filed Dec. 11, 2009, which is hereby incorporated by reference herein in its entirety.

What is claimed is:

1. An inkjet ink comprising:
   a pigment;
   a water-soluble resin having a hydrophobic group, the water-soluble resin including a part adsorbed to the pigment and a part not adsorbed to the pigment;
   an inclusion compound comprising cyclodextrin or a cyclodextrin derivative; and
   water,
   wherein the part not adsorbed of the water-soluble resin has a mass ratio to the inclusion compound in a range of 1.60 to 9.00.

2. The inkjet ink according to claim 1, wherein the water-soluble resin comprises a copolymer produced by copolymerization of a hydrophobic monomer and a hydrophilic monomer.

3. The inkjet ink according to claim 1, wherein the inclusion compound comprises methyl-β-cyclodextrin.

4. A recording unit comprising:
   an ink tank containing the inkjet ink as set forth in claim 1; and
   a recording head having a face side that has been subjected to water-repellent treatment.

5. The recording unit according to claim 4, wherein the water-repellent treatment has been performed with a material containing a fluorine compound.

6. The inkjet ink according to claim 1, wherein the inclusion compound content is in the range of 0.03% to 30% by mass relative to the total mass of the ink.

* * * * *